United States Patent [19]

Rubin et al.

[11] Patent Number: 5,394,155
[45] Date of Patent: Feb. 28, 1995

[54] APPARATUS AND METHOD FOR ESTIMATING WEATHER SPECTRAL MOMENTS

[75] Inventors: William L. Rubin, Whitestone; John W. Davidsen, Massapequa, both of N.Y.

[73] Assignee: Unisys Corporation, Blue Bell, Pa.

[21] Appl. No.: 65,971

[22] Filed: Aug. 16, 1993

[51] Int. Cl.[6] ............................................. G01S 13/95
[52] U.S. Cl. ...................................... 342/192; 342/26
[58] Field of Search ................................. 342/26, 192

[56] References Cited

U.S. PATENT DOCUMENTS

| | | | |
|---|---|---|---|
| 3,340,528 | 9/1967 | Atlas | 342/26 |
| 5,027,122 | 6/1991 | Wieler | 342/26 |
| 5,093,662 | 3/1992 | Weber | 342/26 |
| 5,122,805 | 6/1992 | Peterman et al. | 342/26 |
| 5,130,712 | 7/1992 | Rubin et al. | 342/26 |

FOREIGN PATENT DOCUMENTS

92/21041 11/1992 WIPO ................................. 342/26

Primary Examiner—Gilberto Barrón, Jr.
Attorney, Agent, or Firm—Seymour Levine; Stanton D. Weinstein; Mark T. Starr

[57] ABSTRACT

A spectral moment estimator includes a first processor which processes signals representative of the magnitudes of complex autocorrelation functions of a signal at a plurality lags and provides Doppler spectral width representative signals and the autocorrelation function at zero lag independent of noise. A second processor, processes the complex autocorrelation representative signals, the complex autocorrelation functions phase angles representative signals, and the Doppler spectral width representative signals to provide the mean Doppler frequency of the the signal. The autocorrelation function phase angles are disambiguated and the unambiguous phase angles are least mean square error fitted to a third order odd polynomial, the linear term of which is the mean Doppler frequency of the signal.

11 Claims, 3 Drawing Sheets

APPARATUS AND METHOD FOR ESTIMATING WEATHER SPECTRAL MOMENTS

BACKGROUND OF THE INVENTION

1. Field of the Invention

The present invention relates generally to the estimation of spectral moments of weather radar returns and, more particularly, to an apparatus and method for estimating hydrometeor reflectivity, mean Doppler velocity and Doppler velocity spectral width.

2. Description of the Prior Art

Pulse Doppler radar is used to map severe storm reflectivity and velocity structure. The radar beam's ability to penetrate thunderstorms and clouds permits the determination of the dynamic structure of otherwise unobservable events. This inside look has enabled meteorologists to understand the life cycle and dynamics of storms as well as provide timely severe storm warnings.

Real-time reflectivity PPI maps have been available to meteorologists since the mid-1940's. Real-time Doppler velocity maps were not available until the late 1960's. Since that time meteorologists have been preoccupied with the development of systems that provide real-time spectral measurements in every radar volume within the radar beam, of which mean Doppler velocity and Doppler velocity spectral width are of greatest interest. Thus, the basic task of a modern weather Doppler radar is to provide estimates of the first three spectral moments of weather radar returns. The zero moment is a measure of average signal power return from which "reflectivity" can be calculated. This "reflectivity" is related to the total water content of the volume illuminated by the radar signal. The first moment about zero or "mean Doppler velocity" is a measure of the average radial velocity of hydrometeors in the sample volume. The square root of the second moment about the spectral mean or "Doppler velocity spectral width" is a measure of hydrometeor radial velocity dispersion.

Weather spectral moment estimates derived from the radar returns are uncertain, at any point in time, even for large signal-to-noise (S/N) ratios. This uncertainty is due to the fact that weather radar returns exhibit many of the characteristics of a non-stationary random process and only a finite number of radar data samples are available for each sampled radar volume upon which to base these estimates. These estimates are further degraded at low S/N due to additive white Gaussian noise.

Mean radar power return and reflectivity are related by the radar weather equation:

$$P = \frac{\pi^2 (10^{-1}) P_t g^2 l^2 l_r \tau \theta^2 |k_w|^2 Z_e}{6.75(2^{14})(\ln 2) r_0^2 \lambda^2}$$

where:
P = mean received signal power (milli-watts)
$P_t$ = peak transmitted power (watts)
g = one way antenna gain
l = one way propagation attenuation
$l_r$ = radar losses
$\gamma$ = pulse width (microseconds)
$\theta$ = one way 3 dB width of circular antenna pattern (rad)
$k_w$ = complex refractive index of water
$Z_e$ = effective reflectivity factor (mm$^6$/m$^3$)
$r_o$ = range (km)
$\lambda$ = radar wavelength (cm)

Mean Doppler radial velocity may be estimated in the time domain from the argument of the received signal autocorrelation function as follows:

$$V = -\frac{\lambda}{4\pi T} \arg R(kT) = -\frac{\lambda}{4\pi} \omega_d$$

where
V = estimated mean radial velocity (m/s)
$\omega_d$ = estimated mean Doppler frequency (rad/s)
$\lambda$ = radar wavelength (m)
T = radar pulse repetition interval (s)

$R(kT)$ = autocorrelation function evaluated at lag $k$
$$= \sum_{i=1}^{M-K} z_i^* z_{i+k}$$

(k = 0, ..., M−1)
M = number of received pulses
z = sample of complex video return ($z_i = I_i + jQ_i$)
$I_i$ = in-phase video sample of ith received pulse
$Q_i$ = quadrature video sample of ith received pulse
* denotes complex conjugate Estimates v and $w_d$ are unbiased when the received signal power spectral density is symmetric. This technique, dubbed pulse-pair processing, processes contiguous, overlapping, consecutive pairs of correlated returns from the same target volume.

Theoretical justification for pulse-pair processing rests on the fact that it has been shown that pulse-pair processing of non-overlapping, statistically independent, pulse-pairs is a maximum likelihood estimator of mean velocity of a narrow band Gaussian signal process, with an arbitrary shaped spectrum, that is immersed in Gaussian noise having an arbitrary shaped power spectral density.

Doppler velocity spectral width $\sigma_v$ may also be calculated in the time domain from the magnitude of the received signal autocorrelation function at several lags, assuming a Gaussian shaped signal power spectral density. Several well known expressions for estimating Doppler frequency spectral width $\sigma_f$ which is related to Doppler velocity spectral width $\sigma_v$ by $\sigma_f = 2\sigma_v/\lambda$ are:

$$\sigma_f = \sqrt{\frac{1}{2\pi T}\left(1 - \left|\frac{R(T)}{R(0)}\right|\right)}$$

$$\sigma_f = \sqrt{\frac{1}{2\pi T}\left|\ln\left|\frac{R(0) - N}{R(T)}\right|\right|}$$

$$\sigma_f = \sqrt{\frac{1}{6\pi T}\ln\left|\frac{R(T)}{R(2T)}\right|}$$

where N denotes received noise power.

It is well known that maximum likelihood estimates of spectral moments are quite complicated, difficult to compute, and closed form solutions usually do not exist. The maximum likelihood estimate of mean velocity v for a Gaussian signal process, with a Gaussian shaped power spectral density, immersed in additive white Gaussian noise may be expressed as;

$$V = \frac{\lambda}{4\pi kT} \arg \sum_{k=1} C_k R(kT) \exp \frac{-j4\pi v(k-1)T}{\lambda}$$

where $C_k$ are derived from maximum likelihood estimates of the elements of the inverse covariance matrix of the received signal-plus-noise time series. Although the $C_k$ do not depend on v, they do depend on estimates of the received signal power and spectral width. Hence the estimate of v is coupled to the other two moments. Further, the above expression for v is implicit since v appears on both sides of a transcendental equation. An iterative technique involving, an inordinate number of steps, is required to solve for v. For example, for 16 received pulses (M=16) 137 coupled nonlinear equations must be solved.

The mathematical structure of the maximum likelihood estimator that operates on contiguous pulse-pairs suggested that simpler sub-optimum approaches might be found which used higher order lag values of the autocorrelation function to improve spectral mean accuracy at low signal-noise-ratios (S/N), where estimates of R(kT) are statistically independent for different k. A poly-pulse-pair estimator has been proposed for processing contiguous overlapping pulse-pairs which averages independent higher order lag spectral means estimates to provide $v_k$, the estimate obtained from lag k, $v_k$ having the following form:

$$V_k = \frac{\lambda}{4\pi T} \arg[R(kT)]$$

Estimates of $v_k$ may be weighted prior to averaging, either to minimize the error in the estimate of $v_k$, or more simply, to weight each $v_k$ uniformly. This poly-pulse-pair estimator also requires the argument of R(kT) to be phase unwrapped since higher order lag phase values typically exceed $2\pi$.

Monte Carlo simulation of poly-pulse-pair processing, with equal weighting of $v_k$, has been shown to be more accurate than pulse-pair processing at low S/N but less accurate at high S/N. Since combining multiple estimates of $v_k$ theoretically contains more information about v than that in $v_1$, the latter result was unanticipated and has not been adequately explained.

Few explicit maximum likelihood spectral estimators are known in the prior art. Further, maximum likelihood estimates of the first three spectral moments are in general mathematically coupled. Prior art efforts have been directed at finding sub-optimum uncoupled estimators having error variances that approach the Cramer-Rao lower bound. Because of computational simplicity, pulse-pair processing is widely used for estimating mean Doppler velocity. Poly-pulse-pair processing, as presently configured, yields more accurate estimates of the first spectral moment than pulse-pair processing at low S/N but not at high S/N.

SUMMARY OF THE INVENTION

The present invention provides a signal processor which approximates a maximum likelihood estimator for signals having Gaussian shaped spectral densities. This processor maintains robust performance at both high and low S/N ratios. The processor comprises two complementary signal processors in a weather spectral moment estimation apparatus. The first provides near optimum estimates of mean signal power S and Doppler frequency spectral width $\sigma_f$, from computed magnitudes of the received signal autocorrelation function at multiple lags. The second processor provides a near optimum estimate of mean Doppler frequency $w_d$, using computed arguments of the autocorrelation function at multiple lags and the spectral width estimate provided by the first processor.

The autocorrelation function R(kT) of a received signal is the inverse Fourier transform of the received signal's periodogram. Because the periodogram is a sample of the underlying signal spectral density, its shape will randomly deviate from that of the underlying signal spectral density. Thus, for a signal process with a Gaussian shaped density, its periodograms are accurately described by a Gram-Charlier series expansion whose first term is the Gaussian function. Such a series expansion is fully explained in "Radar Detection", J. V. DiFranco and W. L. Rubin, Prentice-Hall (1968) and Artech House (1980) at section 10.6, which is incorporated herein by reference.

Since the received signal autocorrelation is the inverse Fourier transform of the periodogram, the first term of the periodogram's Gram-Charlier series transforms into an autocorrelation function with a Gaussian shaped envelop. Inverse Fourier transforms of higher order terms of the periodogram's Gram-Charlier series describe deviations from the autocorrelation function of the underlying signal process. Odd order terms affect the autocorrelation function, while even order terms affect the magnitude. The second odd term in the expansion is the dominant source of phase error for lags within $2\sigma_t$ of the autocorrelation peak. Limiting the periodogram approximation to the first two term of the Gram-Charlier series results in a corresponding autocorrelation function whose magnitude has a Gaussian shape and whose phase argument is described by a third degree odd polynomial. These results are used to derive optimal estimates of the first three moments.

It is well known that the magnitude of the received complex autocorrelation function signal component evaluated at zero lag, $R_s(O)$, is related to weather reflectivity. The first processor therefore determines the signal plus noise autocorrelation function magnitude $|R(kT)|$ of the received signal. The autocorrelation function of the signal plus noise at zero lag, R(0), however, contains a Dirac delta function due to white noise. To remove this delta function and obtain the signal autocorrelation function Rs(0), the first processor determines the autocorrelation functions of the signal plus noise for a number of lags and combines these autocorrelation functions to extract Rs(O) and $\sigma_f$, the width of the Doppler spectrum.

Estimates of $w_d$ are provided by the second signal processor in the following manner:

1) The phase of arg{R(kT)} is unwrapped for lags K=1,..., 2 p using a fast Fourier transform (FFT) based estimate of $f_d$ to calculate a reference phase value at each lag.
2) A weighted least mean square error fit is made to the phase unwrapped arg{R(kT)} for lags k=1,2, ..,2 p, by a third degree odd polynomial where errors are weighted by $W(kT)=\exp\{-(kT)^2/2(\sigma_t)^2\}$, and $\sigma_t$ is derived from the first processor's estimate of $\sigma_f$.
3) The coefficient of the polynomial's linear term is selected as an unbiased estimate of $w_d$.

DESCRIPTION OF THE PREFERRED EMBODIMENTS

Weather return may be modeled as a sequence of N complex video samples $z_k = z(kT)$ that are spaced T seconds apart ("Doppler Radar and Weather Observations"—R. J. Doviak and D. S. Zrnic, Academic Press). Each $z_k$ consists of a narrowband signal component, $s_k \exp\{jw_d kT\}$, and a white noise component $n_k$ so that each $z_k$ sample may be represented as:

$$z_k = s_k \exp\{jwdkT\} + n_k$$

$$k = 0, 1, 2, \ldots, N-1$$

where $s_k$ and $n_k$ are assumed to be samples of uncorrelated zero mean Gaussian random processes whose spectra are centered at zero frequency. The received signal power spectral density is assumed to have a true spectral mean $w_d = 2\pi f_d$ and a true spectral width $\sigma_f$ which is narrow relative to the Nyquist interval. Denoting the true signal power by S, the value of the autocorrelation function of the received signal, for a lag k, may be written as:

$$R(kT) = R_k = E\{z_i^* z_{i+k}\} = S\, r(kT)\, \exp\{jw_d kT\} + N\delta_k$$

where r(kT) is the normalized correlation coefficient at lag k, N is the mean white noise power and $\delta_k = 1$ for $k=0$ and zero otherwise.

The periodogram for N complex samples of weather return is a single realization of a Gaussian power spectral density and hence its shape is approximately Gaussian. An approximately Gaussian periodogram G(f) can be accurately represented mathematically by the first few terms of a Gram-Charlier series expansion whose first term is the Gaussian function. The Gram-Charlier series expansion of function F(x) with zero mean and unit variance may be written as:

$$F(x) = \sum_{i=0}^{\infty} a_i f_i(x)$$

where $$f_0(x) = f(x) = [1/\sqrt{2\pi}] \exp\{-x^2/2\}$$

$$f_i(x) = d^i f(x)/dx^i$$

The first three coefficients are $a_0 = 1$, $a_1 = 0$, and $a_2 = 0$ so that F(x) can be rewritten as:

$$F(x) = f(x) + \sum_{i=3}^{\infty} a_i f_i(x)$$

If the mean is not zero or variance $\sigma^2$ is not unity, a related Gram-Charlier expansion can be obtained by expanding a function F(y) where $y = \{(x - \bar{x})/\sigma\}$ is a standardized variable. In this case, $$F(x) = (1/\sigma) \sum_{i=0}^{\infty} c_i f_i\{(x - \bar{x})/\sigma\}$$

where:
$C_0 = 1$
$C_1 = C_2 = 0$
$C_3 = a_3/3!$
$C_4 = (a_4 - 3)/4!$
$C_5 = (a_5 - 10a_3)/5!$
$C_6 = (a_6 - 15a_4 + 30)/6!$ and $a_i$ is the ith central moment of F(x) normalized by $\sigma_i$:

$$a_i = 1/\sigma_i \int_{-\infty}^{\infty} (x - m_1)^i f(x) dx$$

where $m_1$ is the mean or first moment.

Using the $i=0$ and $i=3$ terms in the Gram-Charlier representation, an approximate Gaussian periodogram for the spectrum of weather radar returns is obtained which is given by:

$$G(f) = S\}1/(\sqrt{2\pi}\sigma_f)\}\exp\{-(f-f_d)^2/(2\sigma_f^2)\} - S(a_3 \cdot /6\sigma_f)f^{(3)}\{(f-f_d)/\sigma_f\} + N(f)$$

where N(f) is a power spectral sample of white Gaussian noise, $\sigma_f$ is the spectral variance, and $f_d$, in this case, is the spectral mean of G(f). It follows from the Fourier transform pair:

$$d^n(F(x)/dx^n \rightarrow (jt)^n f(t)$$

that the autocorrelation function R(kT) = R(t) corresponding to periodogram G(f) may be written as:

$$R(t) = S[1 + jd_3 t^3] \exp(jw_d t)\, \exp(-t^2/2(\sigma_t)^2) + n(t)$$

where $\sigma_t = \frac{1}{2}\pi\sigma_f$, and n(t) is the Fourier transform of N(f) and describes complex white noise. For $t < 2\sigma_t$ and sufficiently long observation times, $d_3 t^3 << 1$ in which case $(1 + jd_3 t^3) \approx \exp\{jd_3 t^3\}$ so that for large S/N:

$$\arg\{R(kT)\} \approx w_d kT + d_3(kT)^3$$

where t has been replaced by kT.

Correctly unwrapping arg[R(kT)} requires only very approximate knowledge of the true value of $w_d$. This is easily found by taking the FFT of R(kT) for lags (1, . . . ,p) and selecting the peak value $f_p$ of periodogram G(f) as an approximate estimate of $f_d$. By assuming that $\arg\{R(kT)\} \approx 2\pi f_p kT$, multiple $2\pi$ phase ambiguities may be correctly eliminated for lags up through 2 p, where 2 p = 2 ot.

When S/N is small, the value of $|R(kT)|$ is representative of the ratio of the signal component to the noise component at the kth lag. In this case a weighting function should be provided which weights mean square errors for lags having a large signal component proportionately more heavily than errors for lags having a small signal component. Since $|R(kT)|$ is approximately Gaussian, optimum weighting is provided by a normalized Gaussian weighting function W(kT) given by:

$$W(kT) = \exp\{-(kT)^2/2(\sigma_t)^2\}$$

{k=1 ..., 2p}

It should be apparent from the above that the spectral width estimate $\sigma_f$ impacts mean Doppler frequency estimate $w_d$ principally through the error weighting function $W(kT)$ since $\sigma_t = 1/(2\pi\sigma_f)$. A small error in $\sigma_t$ alters the weighting applied to mean square errors but does not change the basic data. This permits a near optimum estimate of $w_d$ to made with an uncoupled estimate of $\sigma_f$.

From previously stated expressions for the autocorrelation function it can be seen that the expected value of $R(0)$ is $(S+N)$. Hence an estimate of S can be obtained from $R(0)$ if white noise power N is known. This procedure is known to have problems since only a sample estimate of N can be obtained and this value may vary, for example, with antenna pointing angle. Hence a different approach is used.

The signal plus noise autocorrelation function magnitude $|R(kT)|$ is computed from quadrature samples $I_i$ and $Q_i$ of the received signal plus receiver noise to obtain:

$$|R(kT)| = \left\{ \sum_i I_i I_{i+k} + Q_i Q_{i+k} \right\}^{\frac{1}{2}} \quad k = 0, 1, 2, \ldots$$

$|R(kT)|$ contains a Dirac delta function at $k=0$ due to white receiver noise, so that $R(0)$ is not equal to $R_s(0)$ for S/N less than zero. To avoid this error the magnitude of the autocorrelation function $|R(kT)|$, which has an approximately Gaussian shape as shown above, is approximated around zero by the first two even terms of a MacLaurin series. $R_m$, the magnitude of the autocorrelation at the mth lag ($t=mT$) in such a MacLaurin series is:

$$R_m(0) = R_s(0) + (\tfrac{1}{2})(mT)^2 R''(0)$$

where Rs(0) is the value of the signal autocorrelation function evaluated at $t=0$, $R''(0)$ is the second derivative of $R(t)$ evaluated at $t=0$, and T is the interpulse spacing.

Eliminating $R''(0)$ by combining results for two different lags, m and n, provides:

$$R_s(0) = \frac{n^2 R_m - m^2 R_n}{n^2 - m^2}$$

This expression permits reflectivity to be estimated without contamination from the white noise delta function at zero. Additional improvement is obtained by averaging estimates of Rs(0) for two or more lags, as for example for pairs (m=1,n=3) and (m=2,n=4).

In a similar manner an expression for $R''(0)$ can be derived:

$$R''(0) = \frac{2(R_n - R_m)}{(nT)^2 - (mT)^2}$$

It is well known that the spectral width, $\sigma_f$, can be estimated from:

$$\sigma_f = (1/4\pi^2) \frac{R''(0)}{R_s(0)}$$

consequently:

$$\sigma_f = (1/2\pi^2 T^2) \frac{R_n - R_m}{n^2 R_m - m^2 R_n}$$

It should now be recognized that an estimate of $w_d$ may be obtained as follows:
1) Unwrap the phase of $\arg[R(kT)]$ using the previously described procedure.
2) Calculate a weighted least mean square error fit to $\arg\{R(kT)\}$ using a third order odd polynomial where the unwrapped phase mean square error for each lag, $k = 1, \ldots, 2m$ is weighted by $$W(kT) = \exp\{(kT)^2/2\sigma_t^2\}$$

3) The coefficient of the linear term in the third order polynomial is an unbiased estimate of $w_d$.

Figure 1:
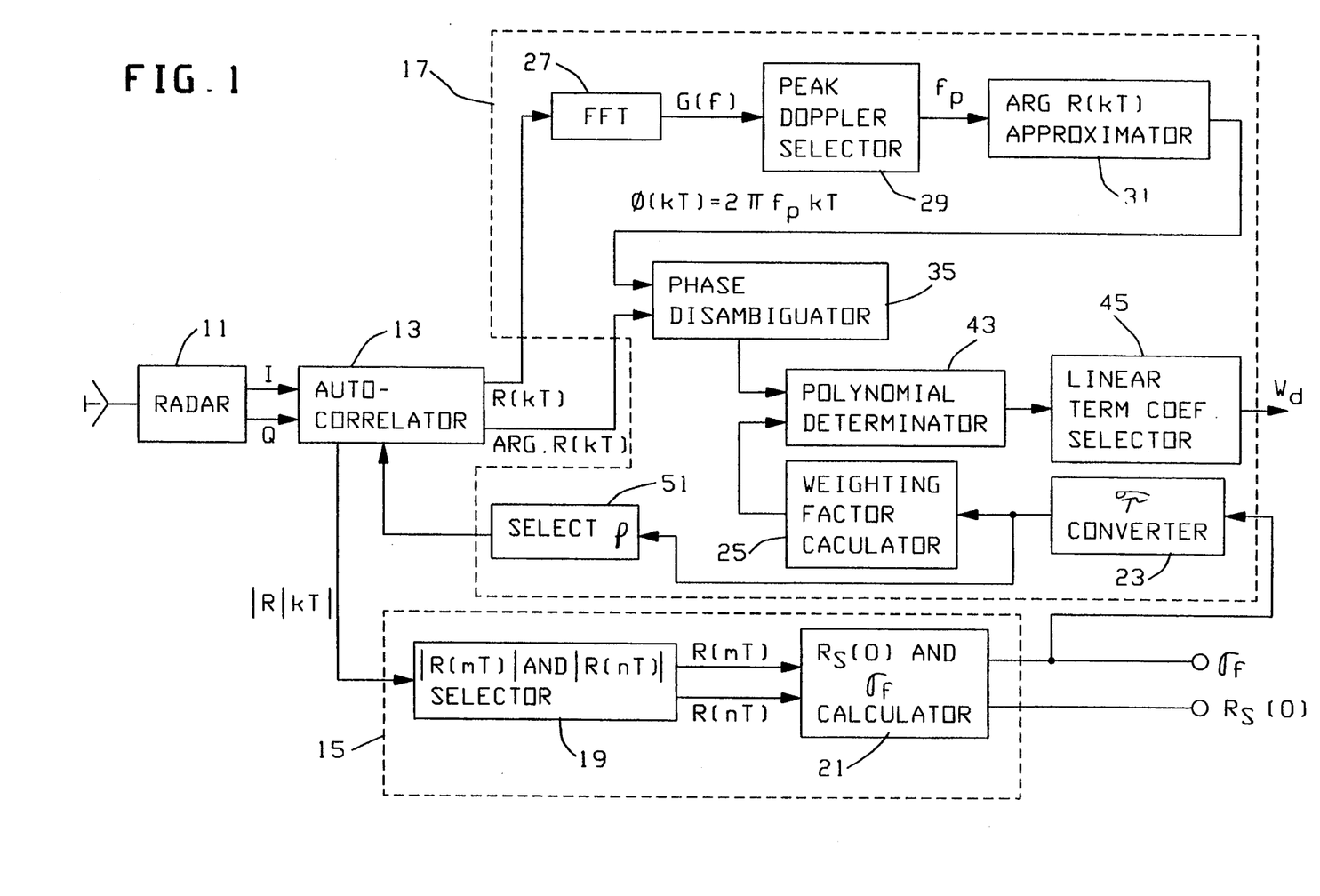
FIG. 1 is a block diagram of a preferred embodiment of the invention.
Figure 2:
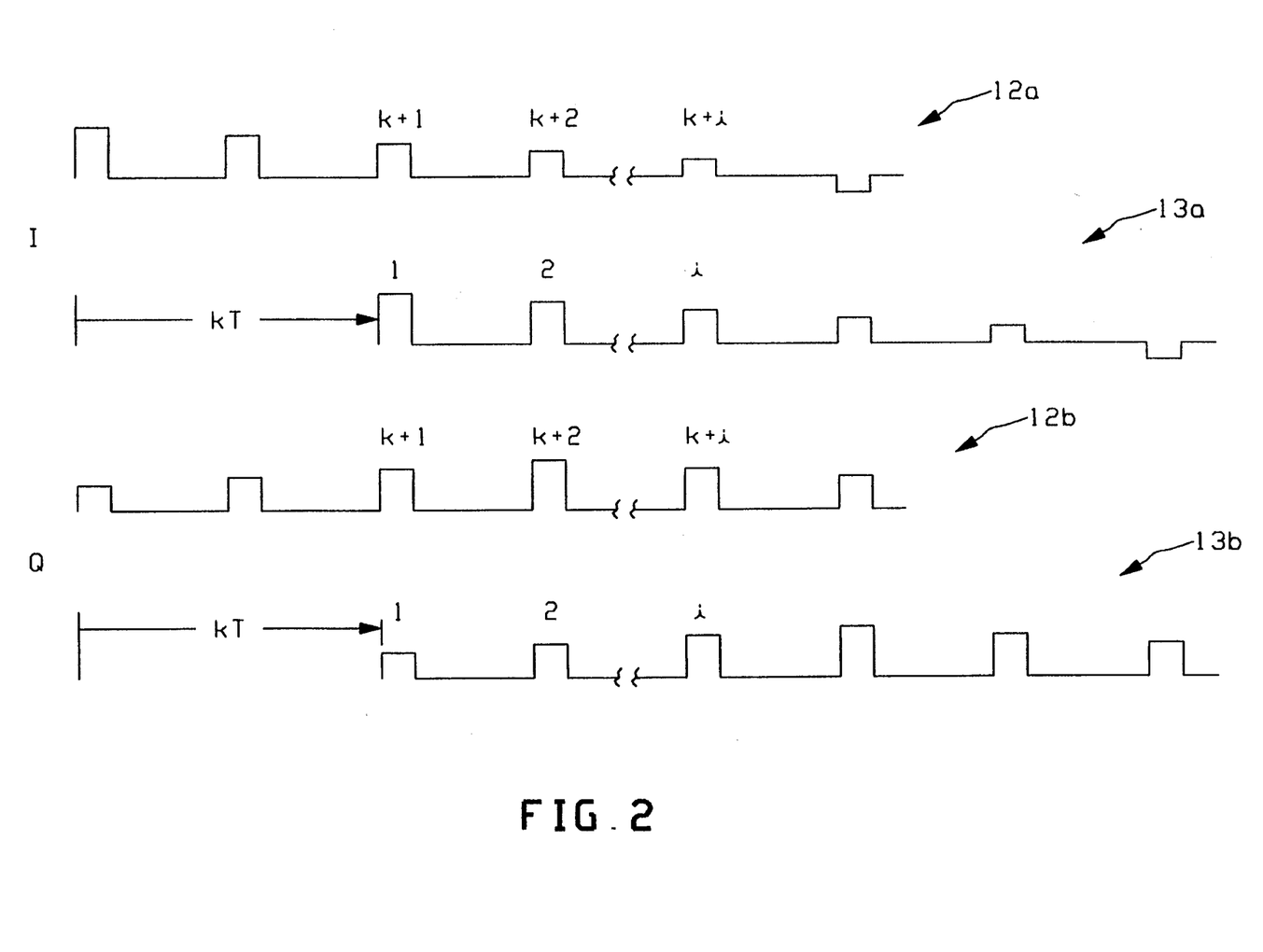
FIG. 2 is a representation of two pulse trains useful for explaining the method by which the autocorrelation of weather radar returns is obtained.

Refer now to FIGS. 1 and 2. Two bi-polar pulse trains, I the inphase component and Q the quadrature component, of the returned radar pulse train are coupled from the radar receiver 11 to an autocorrelator 13 wherein the autocorrelation of the received weather radar return signal is obtained. Each of the two pulse trains, I and Q, is split into two identical pulse trains. One pulse train, 12a for I and 12b for Q, is not delayed, while the second pulse train, 13a for I and 13b for Q, is delayed for time kT, where T is the pulse period and k is the number of periods of the delay, as shown in FIG. 2. It should be recognized that the carrier frequency of the received pulses is Doppler shifted due to the radial velocity of the weather scatterers. Since the received pulses are returns of pulses transmitted with time intervals therebetween, the reflected transmitted pulses are from the same scatterers at different radial distances. Consequently, a relative phase difference of the carrier frequency exists between the received radar pulses which results in a bi-polar amplitude modulation of the I and Q pulse trains at the Doppler frequency. The complex autocorrelation function value $R(kT)$, its magnitude, and its phase at each lag k may be calculated by multiplying the bi-polar amplitude of each pulse in the first pulse train (12a,12b) by the overlapping pulse in the second pulse train (13a,13b) to obtain the products $I_i I_{i+k}$ and $Q_i Q_{i+k}$. Additionally the bi-polar amplitude of each pulse in the pulse train 12a is multiplied by the bi-polar amplitude of the overlapping pulse in the delayed pulse train 13b to obtain $I_i Q_{i+k}$. A similar multiplication of the pulse train 12b by the pulse train 13b yields $I_{i+k} Q_i$. These products may then be combined to obtain:

$$R(kT) = [I_i I_{i+k} + Q_i Q_{i+k}] + j[I_i Q_{i+k} - I_{i+k} Q_i]$$

$$\arg(kT) = \tan^{-1} \frac{I_i Q_{i+k} - I_{i+k} Q_i}{I_i I_{i+k} + Q_i Q_{i+k}}$$

$$|R(kT)| = \{[I_i I_{i+k} + Q_i Q_{i+k}]^2 + [I_i Q_{i+k} - I_{i+k} Q_i]^2\}^{\frac{1}{2}}$$

The autocorrelator 13, in addition to calculating the autocorrelation function $R(kT)$, determines the magnitude of the autocorrelation function $|R(kT)|$ and its phase $\arg R(kT)$. Signals respectively representative of these three values are provided as output signals from the autocorrelator 13. The autocorrelation function magnitude $|R(kT)|$ is coupled to a first processor 15, while the complex autocorrelation function $R(kT)$ and its phase arg R(kT) are coupled to a second processor 17.

Included in the first processor 15 is an autocorrelation magnitude selector 19 coupled to receive the autocorrelation function magnitude output signals of the autocorrelator 13. Selector 19 selects the magnitude of two autocorrelation functions having lags m and n, for example m may be equal to one and n may be equal to three. The selected representative signals are coupled to reflectivity/spectral width calculator 21 which processes these two signals to obtain signals representative of Rs(0), the reflectivity of the weather scatterers and $\sigma_f$, the spectral width of the Doppler shifted frequency where $$R_s(0) = \frac{n^2 R_m - m^2 R_n}{n^2 - m^2}$$

$$\sigma_f = (1/2 \ \pi^2 T^2) \frac{R_n - R_m}{n^2 R_m - m^2 R_n}$$

The signals representative of Rs(0) and $\sigma_f$ may be coupled to a weather forecasting processor, not shown, for inclusion in the weather forecasting process. The $\sigma_f$ representative signal is also coupled to the second processor 17 where it is utilized for obtaining a signal representative of the mean Doppler frequency.

Signals representative of more accurate estimates of reflectivity and spectral width may be obtained by selecting two sets of autocorrelation functions, as for example one set having m=1, n=3 and the other set m=2, n=4, obtaining the reflectivity and spectral width for each set, and then obtaining signals representative of Rs(0) and $\sigma_f$ that respectively are the average of the reflectivity and spectral width for each set.

The signal representative of $\sigma_f$ is coupled to $\sigma_t$ converter 23 wherefrom a signal representative of $\sigma_t$, the autocorrelation function width, where $\sigma_t=(\frac{1}{2}\pi)\sigma_f$, is coupled to weighting factor calculator 25 which provides signals representative of weighting factors $W(kT)=\exp\{-(kT)^2/(2\sigma_t 2)\}$.

The signal representative of the autocorrelation function width, $\sigma_t$, is coupled to P-selector 51 wherein an integer number P is selected which minimizes $[PT-\sigma_t]$. A signal representative of the integer number P is coupled to autocorrelator 13 wherefrom values of the autocorrelation function are then provided in accordance with P, as will be explained. As stated previously, the autocorrelation function R(kT) and the periodogram G(f) for weather radar signal returns are Fourier transform pairs. The peak value of the periodogram is at a frequency $f_p$ that approximates the estimate of the mean Doppler frequency $f_d$. To obtain $f_p$, the autocorrelator 13 output signal that is representative of the complex autocorrelation function values R(kT) for lags values 1,2,...,P are coupled to a fast Fourier transform (FFT) processor 27 which provides signals representative the periodogram for the weather radar signal returns. These periodogram signals are coupled to a peak doppler frequency selector 29 wherein the frequency $f_p$ of the peak value of the periodogram is determined.

This determination may be made through a series of comparisons of periodogram amplitudes at respective frequencies to establish the frequency at which the amplitude peaks. A signal representative of $f_p$ is coupled from the peak Doppler frequency selector 29 to a phase approximator 31.

Figure 3:
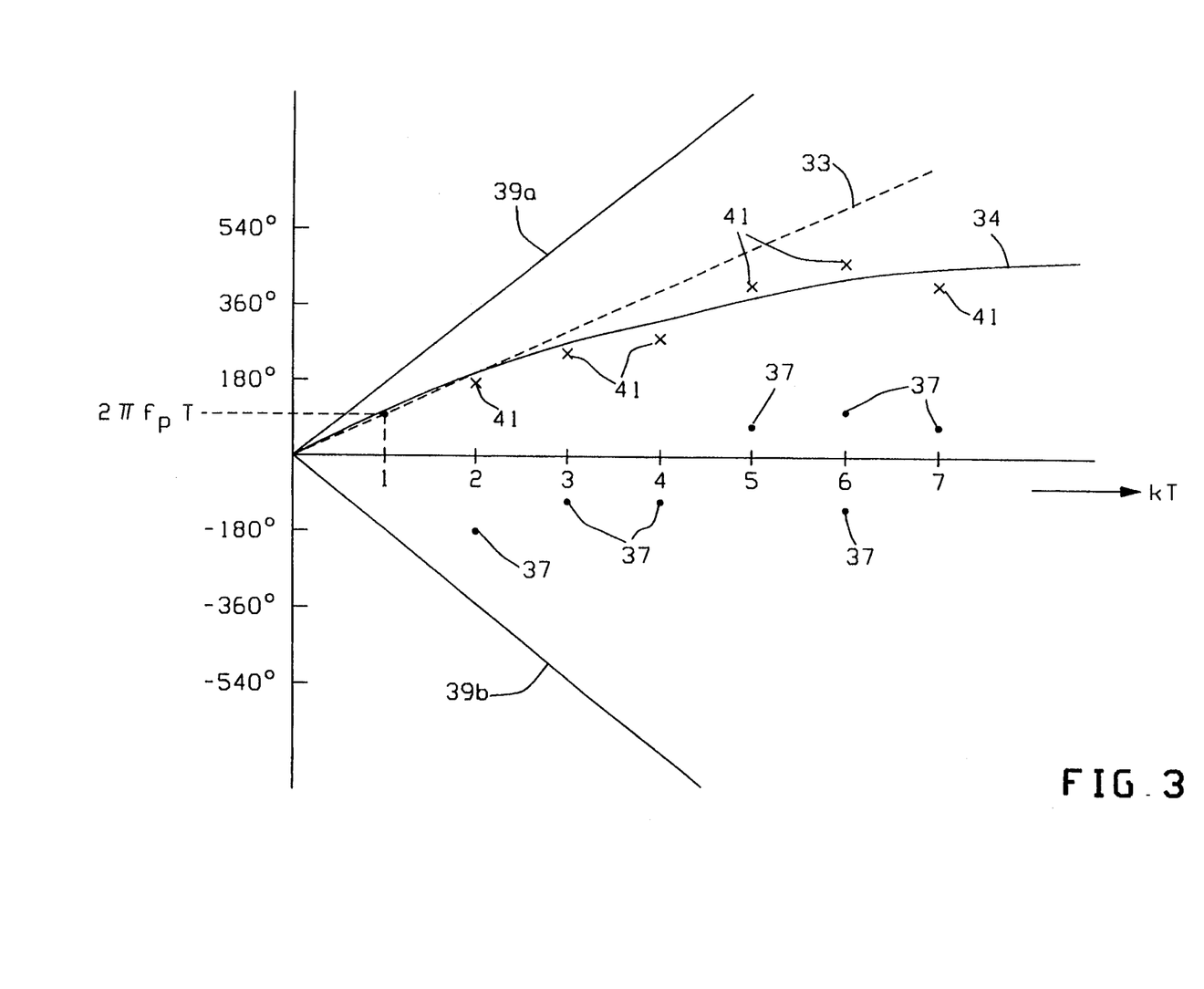
FIG. 3 is a representation of data points and curves useful for explaining the operation of the polynomial determinator shown in FIG. 1.

Arg R(kT) is equal to $\tan^{-1} ImR(kT)/ReR(kT) =$ $$\tan^{-1} \frac{I_i Q_{i+k} - I_{i+k} Q_i}{I_i I_{i+k} + Q_i Q_{i+k}},$$

where Im R(kT) is the imaginary component of R(kT) and Re R(kT) is the real component of R(kT). It is therefore obvious that arg R(kT) is modulo $2\pi$. Consequently, for values of k greater than one arg R(kT) may be ambiguous in that $\phi(kT)$ may be equal to $2\pi q + \phi_m$, where $\phi_m$ is the phase indicated by the arc tangent value. For a Gaussian shaped periodogram with a peak amplitude at $f_p$ a plot of arg R(kT) versus (kT) is a straight line with a slope that is equal to $2\pi f_p$. Since R(T), the autocorrelation function for lag one, has an unambiguous phase, $2\pi f_p$ provided by the approximator 31 for lag one may be employed to establish an approximation to arg R(kT) for lags 1 through 2 p. Such an approximate function $\Theta(kT)$ is indicated by the straight line 33 in FIG. 3. Signals representative of this function are coupled from the approximator 31 to a phase disambiguator 35. Also coupled to the phase disambiguator 35 are the autocorrelation phases, arg R(kT), for lags 1 through 2 P determined by the autocorrelator 13 in accordance with the value of P provided by the P-selector 51

The arg R(kT) indicated phases provided by the autocorrelator 13, which must be disambiguated (unwrapped) are shown in FIG. 3 at the phase locations 37. Since arg R(T), which is unambiguous, can only have values between plus or minus 180° ($-180° \le$ arg R(kT)$\le 180°$) all indicated phase values must lie between lines 39a and 39b having the straight line equation $\phi(kT)=\pm 180$ kT. Phase disambiguator 35 compares indicated arg R(kT) to the value of $\Theta(kT)$ and provides an integer N multiplier of $2\pi$, so that when $2\pi$N is added to the indicated arg R(kT) the phases of R(kT) are repositioned to phase locations 41 that most closely approach the straight line 33. Signals representative of these repositioned phase values are coupled from the phase disambiguator 35 to a polynomial determinator 43 wherein the square between the difference of the repositioned phase angles and the corresponding value of a third order polynomial 34, $\phi(kT)=d_1(kT)+d_3(kT)^3$, is multiplied by a corresponding weighting factor. Designating the repositioned phase angles as $\Theta_1(kT)$, the above may be expressed as $$P(kT)=[\Theta_1(kT)-\phi(kT)]^2 exp\ [-(kT)^2/2\sigma_t 2].$$

Processing in the polynomial determinator 43 continues by choosing the coefficients d1 and d3 to minimize P(kT). The coefficient of the linear term, $d_1$ is an unbiased estimate of the mean radian Doppler $w_d$. Signals representative of $\phi(kT)$ are coupled to a linear term coefficient selector 45 which extracts the coefficient $d_1$ and provides signals representative thereof to the weather radar processor, not shown.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for estimating spectral moments of a received radar signal comprising:

an autocorrelator having input means for receiving signals representative of the received radar signal, said autocorrelator providing signals representative of complex autocorrelation function values for said received radar signal, signals representative of phase angles of said complex autocorrelation function values, and signals representative of magnitudes of said complex autocorrelation function values;

first processor means coupled to receive said signals representative of magnitudes of said autocorrelation function values for providing signals representative of autocorrelation function values at lag zero with noise components removed therefrom and signals representative of Doppler frequency shift spectral width of said received signals; and second processor means coupled to receive said signals representative of said complex autocorrelation function values, said signals representative of said phase angles, and said signals representative of said Doppler frequency shift spectral width of said received signals for providing a signal representative of mean Doppler frequency shift of said received radar signal.

2. An apparatus in accordance with claim 1 wherein said first processor means comprises:

selector means coupled to receive said signals representative of said complex autocorrelation function values for selection of signals representative of at least one pair of autocorrelation function values, a first signal representative of a first autocorrelation function value of said at least one pair at a first lag and a second signal representative of a second autocorrelation function value of said at least one pair at a second lag different from said first lag; and calculator means coupled to receive said first and second representative signals for providing said signals representative of autocorrelation function values at lag zero and said signal representative of said Doppler frequency shifts spectral width of said received signals.

3. An apparatus in accordance with claim 1 wherein said second processor comprises:

phase angle approximation means coupled to receive said signals representative of said complex autocorrelation function values for providing signals representative of a linear function approximation of autocorrelation function phase angles versus lag;

disambiguation means coupled to receive said signals representative of said linear function approximation and said signals representative of phase angles of said complex autocorrelation function values for providing signals representative of phase angles of said complex autocorrelation functions with $2n\pi$ ambiguities removed, thereby providing signals representative of unambiguous phase angles; and mean Doppler frequency means coupled to receive said signals representative of said unambiguous phase angles and said signals representative of Doppler frequency shift spectral width for providing said signal representative of said mean Doppler frequency.

4. An apparatus in accordance with claim 3 wherein said mean Doppler frequency means comprises:

converter means coupled to receive said signals representative of said Doppler frequency shift spectral width for converting said signals representative of said Doppler spectral width to signals representative of autocorrelation function width of said autocorrelation functions;

weighting factor means coupled to receive said autocorrelation function width representative signals for providing signals representative of weighting factors respectively corresponding to said autocorrelation function values;

polynomial means coupled to receive said weighting factor representative signals and said unambiguous phase angles representative signals for providing signals representative of a least mean square error fit of said unambiguous phase angles to a third order odd polynomial, thereby providing polynomial representative signals; and coefficient selector means coupled to receive said polynomial representative signals for selecting a linear term coefficient and providing a signal representative thereof, said linear term coefficient representative signal being said mean Doppler frequency shift representative signal.

5. An apparatus in accordance with claim 4 wherein said second processor means further comprises lag selector means coupled to receive said autocorrelation function width representative signal for selecting lags at which autocorrelation function values are to be taken and providing signals representative of said lags to said autocorrelator so that autocorrelations are performed at said lags.

6. A method for estimating spectral moments of a received radar signal having an interpulse interval T comprising the steps of:

autocorrelating said received radar signal at a plurality of lag numbers to obtain signals representative of complex autocorrelation function values at a plurality of said lag numbers;

determining magnitudes and phase angles of said complex autocorrelation values and providing magnitude and phase angle representative signals;

processing said magnitude representative signals to obtain a signal representative of an autocorrelation function value at lag zero with noise components removed therefrom and to obtain a signal representative of Doppler frequency spectral width;

converting said Doppler frequency spectral width representative signal to a signal representative of an autocorrelation function width; and obtaining a signal representative of mean Doppler frequency of said received radar signal from said complex autocorrelation function values representative signals, said phase angles representative signals and said autocorrelation function width representative signal.

7. The method of claim 6 further comprising the steps of:

selecting a value P which minimizes $|PT - \sigma_t|$; and directing said plurality of lag numbers to be one (1) through P.

8. The method of claim 6 wherein said magnitude converting step comprises the steps:

selecting magnitudes of first and second correlation function values, respectively, for first and second lag numbers of said plurality of lag numbers; and determining said autocorrelation function value at lag zero and said Doppler frequency spectral width from said magnitudes of said first and second autocorrelation values.

9. The method of claim 6 wherein said step of obtaining mean Doppler frequency comprises the steps of:
   approximating a linear function of correlation phase angles versus lag utilizing said complex autocorrelation values;
   comparing said phase angles of said complex autocorrelation function values at selected lags to phase angles at lags of said linear function, corresponding respectively to said selected lags;
   adding a multiple of $2\pi$ to each phase angle of said complex autocorrelation function values to establish a phase angle which most closely approaches that phase angle on said linear function at said respective corresponding lag to provide disambiguated phase angles of said complex autocorrelation function values;
   determining a least mean square fit of phase angle versus lag to said disambiguated phase angles, said least mean square fit having a linear term with a coefficient thereof; and
   selecting said coefficient of said linear term as said mean Doppler frequency.

10. The method of claim 9 wherein the approximating step includes the steps of:
   establishing a periodogram for said received radar signal frequency content;
   selecting that frequency $f_p$ of peak value in said periodogram;
   multiplying $f_p$ by $2\pi kT$, where k is an integer, to obtain $\phi(kT)=2\pi kT$, a linear function of phase $\phi(kT)$ versus lag number k.

11. An apparatus in accordance with claim 3 wherein said phase angle approximation means includes:
   statistical means coupled to receive said complex autocorrelation function values representative signals for establishing a periodogram of said received radar signal frequency content and providing signals representative of said periodogram;
   selector means coupled to receive said periodogram representative signals for selecting that frequency of said periodogram having a value greater than values of all other frequencies of said periodogram, and providing a signal representative of said peak value frequency;
   linear approximation means coupled to receive said peak value frequency representative signal for providing said signals representative of said linear approximation of said phase angles of said complex autocorrelation function values.

* * * * *